United States Patent [19]
Vannini et al.

[11] Patent Number: 5,315,817
[45] Date of Patent: May 31, 1994

[54] CONTROL SYSTEM FOR PREVENTING CRASH ENGAGEMENT OF A RATCHET AND PAWL CLUTCH DURING RESTART OF A TURBINE ENGINE

[75] Inventors: Robert M. Vannini, Longmeadow; Joseph Kos, Holyoke, both of Mass.; James E. Neville, Broad Brook; Robert D. Shangraw, East Granby, both of Conn.

[73] Assignee: United Technologies Corporation, Hartford, Conn.

[21] Appl. No.: 931,166

[22] Filed: Aug. 17, 1992

[51] Int. Cl.⁵ .............................................. F02G 3/00
[52] U.S. Cl. ................................ 60/39.091; 60/39.142
[58] Field of Search ............... 60/39.142, 39.2, 39.091; 74/7 C, 7 R; 192/42

[56] References Cited

U.S. PATENT DOCUMENTS

| | | | |
|---|---|---|---|
| 3,727,733 | 4/1973 | Mrazek | 192/42 |
| 4,702,273 | 10/1987 | Allen et al. | 137/487.5 |
| 4,926,631 | 5/1990 | Sorenson | 74/7 C |
| 5,127,220 | 7/1992 | Jesrai et al. | 60/39.142 |

FOREIGN PATENT DOCUMENTS

| | | | |
|---|---|---|---|
| 0331982 | 9/1989 | European Pat. Off. | F02C 7/277 |
| 0343412 | 11/1989 | European Pat. Off. | F02C 7/277 |
| 9209821 | 6/1992 | World Int. Prop. O. | F02C 7/277 |

Primary Examiner—Richard A. Bertsch
Assistant Examiner—W. J. Wicker
Attorney, Agent, or Firm—William W. Habelt

[57] ABSTRACT

A method and control system for modulating a starter turbine (14) speed to a predetermined reference speed to prevent crash engagement with a turbine engine (16) during restart. The turbine engine (16) is coupled to the starter turbine (14) by a ratchet and pawl clutch (17), and crash engagement is prevented by modulating the starter turbine (14) speed to the predetermined reference speed, which is below a minimum pawl engagement speed, until the pawls have locked-in. A control system (10) in accordance with the present invention includes an electronic control (18) section and a mechanical pneumatic actuation means (20) which operate to limit the speed of the starter turbine (14) to the predetermined reference speed which is below the minimum speed at which crash engagements occur. The electronic control (18) provides an adjustment signal (26) corresponding to the difference between a sensed starter turbine speed signal (24) and a reference speed signal (49). The mechanical pneumatic actuation means (20) modulates an air flow into the starter turbine (14) in response the adjustment signal (26), thereby modulating the speed of the starter turbine (14) to the predetermined reference speed.

4 Claims, 3 Drawing Sheets

CONTROL SYSTEM FOR PREVENTING CRASH ENGAGEMENT OF A RATCHET AND PAWL CLUTCH DURING RESTART OF A TURBINE ENGINE

TECHNICAL FIELD

This invention relates to the starting of turbine engines, and more particularly to preventing crash engagement of a ratchet and pawl clutch during restart of a turbine engine by modulating the speed of a starter turbine during restart.

BACKGROUND ART

A turbine engine, such as the type used to power aircraft, requires assistance to start. Typically, an aircraft that is powered by a turbine engine has a starter turbine to provide the required assistance. In such a system, the starter turbine is coupled to the turbine engine by a ratchet and pawl clutch, for example such as disclosed in U.S. Pat. No. 3,727,733, issued Apr. 17, 1973 to Mrazek.

The ratchet and pawl clutch includes a toothed ratchet member, pivotal pawls, and a set of springs for each pawl. The toothed ratchet member has a plurality of teeth and is operationally connected to a drive shaft which is mounted for rotation therewith the starter turbine. The pivotal pawls are connected to a driven shaft which is mounted for rotation with the turbine engine. When the driven shaft is at rest, i.e., the turbine engine is at rest, the springs act to bias the toes of the pawls inward against the ratchet member such that the pawls engage the ratchet member. When the driven shaft is rotated at high speed subsequent to ignition in the turbine engine, centrifugal force counteracts the spring force so that the pawls disengage, that is lift-off, from the ratchet member.

The ratchet and pawl clutch couples the starter turbine to the turbine engine in such a way that the starter turbine can provide only positive torque to the turbine engine. Assuming the turbine engine is rotating below the disengage speed, if the starter turbine, and thus the ratchet member, is rotating faster than the turbine engine, and thus the pawls, the pawls will lock-in to the ratchet member. However, if the pawls are moving faster than the ratchet member, the pawls will slide or "ratchet" over the teeth of the ratchet member. The term "lock-in" refers to the situation in which the toes of the pawls are nested between adjacent teeth of the ratchet member and the ratchet member is transferring positive torque to the shaft. Engaged pawls may be either locked-in or ratcheting.

During a normal start-up, high pressure air is fed to the starter turbine from an auxiliary power unit or another previously started turbine engine. As the starter turbine begins to rotate, the already engaged pawls lock-in to the ratchet member. Thus, the clutch transmits positive accelerating torque from the starter turbine to the turbine engine. When the main turbine reaches a prescribed speed, ignition occurs. After ignition, the turbine engine accelerates and becomes self sustaining. Eventually, the turbine engine reaches a speed, commonly referred to as "lift-off" speed, where centrifugal force causes pawl disengagement, thereby disconnecting the turbine engine from the starter turbine. At that point, the starter turbine is shut off and the turbine engine accelerates to its steady state speed.

A starter turbine can also be used to restart a turbine engine in the event of a flame-out resulting in an unwanted shut down of the turbine engine. When the flame-out occurs, the turbine engine decelerates due to friction and air loads. If high pressure air is fed to the starter turbine after the turbine engine has decelerated to the speed where the pawls become engaged, the starter turbine will accelerate with the pawls ratcheting until it reaches the speed of the turbine engine. When both turbines are at the same speed, the pawls lock-in and the starter turbine supplies positive accelerating torque to the turbine engine. With the assistance of the starter turbine, the turbine engine ignites and accelerates, eventually becoming self sustaining.

However, depending on the sequence of events, a destructive crash engagement may occur when attempting a restart after flame-out. If high pressure air is fed to the starter turbine before the pawls are engaged, the starter turbine will rapidly accelerate to a speed, termed its no-load speed, much higher than the speed at which the pawls engage. Therefore, when the pawls do engage, the great difference in speed between the two turbines results in a destructive crash engagement which may cause severe damage to the clutch.

It is known in the prior art to prevent crash engagement with a system that disables the starter turbine until all of the pawls are known to be engaged. Such a system is relatively simple to implement as both a turbine engine speed feedback signal and on/off control of the starter turbine are available through an electronic engine control, EEC, which is present on many aircraft. However, such a system still allows a relatively hard engagement since the starter turbine is rapidly accelerating when engagement occurs. Further, an air crew may mistake a disabled starter turbine for a non-functional starter turbine and become unnecessarily alarmed.

DISCLOSURE OF INVENTION

An object of the present invention is to prevent crash engagement of a ratchet and pawl clutch during restart of a turbine engine.

Another object of the present invention is to ensure a soft lock-in of the pawls and the ratchet member during restart.

According to the method aspect of the present invention, the speed of an engagement means is controlled to a reference speed, which is below a known minimum engagement speed, until lock-in occurs, the engagement means is then allowed to accelerate a turbine engine once lock-in has occurred. In accord with a further aspect of the present invention, a control system comprising a pneumatic modulating valve, a speed sensing means, and an electrical control is provided to control the speed of the engagement means.

The present invention provides for an exceptionally soft lock-in while preventing crash engagement. Whereas prior art starter turbine disabling systems allowed the starter turbine to accelerate from zero to the turbine engine speed, thereby allowing a lock-in at a relatively high speed where the starter turbine has enough momentum to possibly damage the clutch, the method and control system of the present invention limit the acceleration and momentum of the starter turbine in a way that provides a softer lock-in.

BRIEF DESCRIPTION OF THE DRAWING

The aforementioned and other objects, features and advantages of the present invention will become more apparent in light of the following detailed description of the invention and the embodiment thereof illustrated in the accompanying drawing, wherein.

BEST MODE FOR CARRYING OUT THE INVENTION

Figure 1:
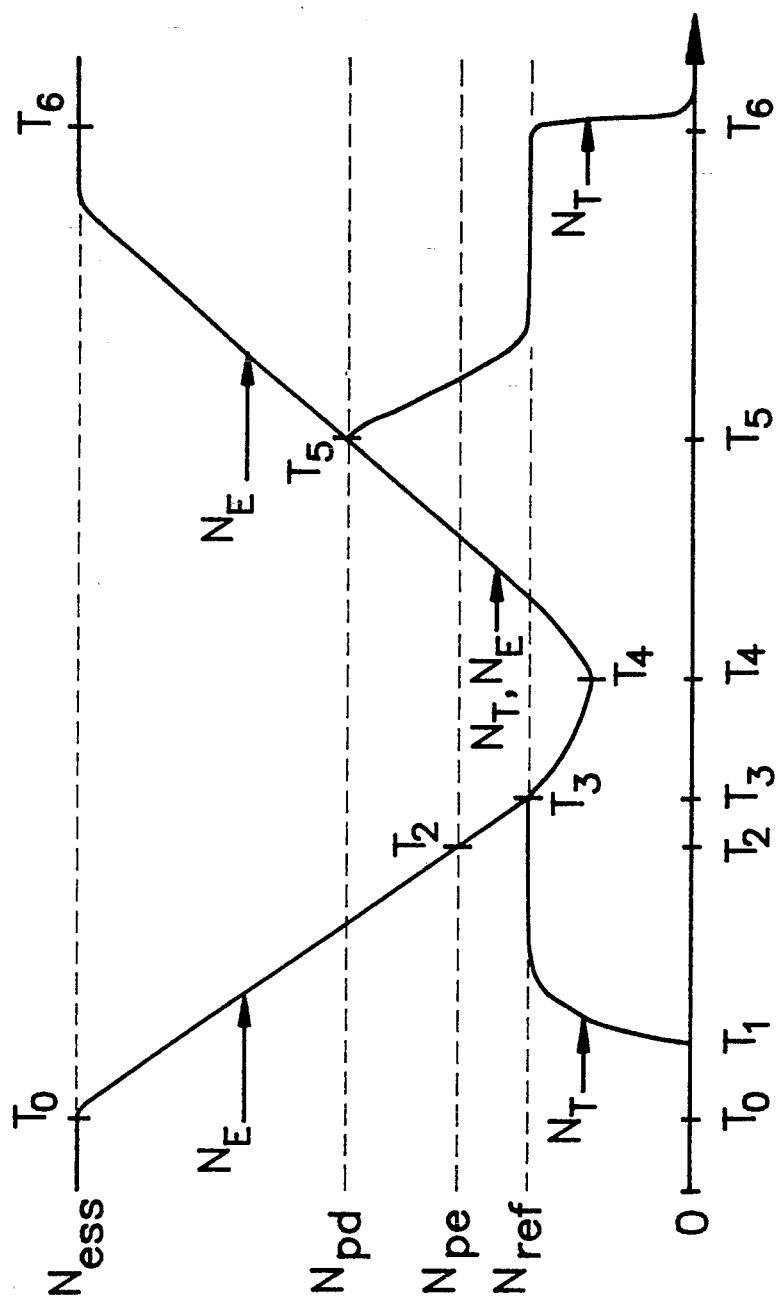
FIG. 1 is a plot of starter turbine speed and turbine engine speed versus time for a restart in accordance with the method and control system of the present invention.

Referring now to FIG. 1, there is depicted therein a plot of a turbine engine speed, $N_E$, and a starter turbine speed, $N_T$, versus time. The plot illustrates a restart after flame-out sequence for a turbine engine and a starter turbine, which are coupled by a ratchet and pawl clutch, by means of a method and control system in accordance with the present invention. Seven significant events in time are labeled $T_0$, $T_1$, $T_2$, $T_3$, $T_4$, $T_5$, and $T_6$.

For time prior to $T_0$, the turbine engine runs at a steady state speed, $N_{ess}$, and the starter turbine is off, i.e., $N_T=0$. At $T_0$, a flame-out occurs in the turbine engine. After the flame-out, $N_E$ starts to drop due to friction and air loads.

At $T_1$, the starter turbine is actuated, and accelerates to and holds at a predetermined reference speed, $N_{ref}$. $N_{ref}$ is slightly below a minimum pawl engagement speed, $N_{pe}$, such as, e.g., $N_{pe}-200$ rpm. $N_{pe}$ is the speed at which all of the pawls, which typically engage at slightly different speeds, are known to be engaged. Initially, $N_T$ may exceed $N_{ref}$ due to an imperfect response, i.e. "start-up transient", of a control system which controls $N_T$. If the pawls were to engage while $N_T$ was in excess of $N_{pe}$, a lock-in involving fewer than all pawls or a crash engagement could occur. Therefore, the value of $N_{pe}-N_{ref}$ should be large enough that $N_T$ cannot exceed $N_{pe}$ under the influence of the start-up transient.

At $T_2$, all of the pawls have engaged since the turbine engine is at $N_{pe}$. Also, the pawls are ratcheting since $N_E$ is greater than $N_T$. At $T_3$, the pawls lock-in, i.e., $N_E=N_T$. After lock-in, the greater inertia of the turbine engine slows the starter turbine. In order to provide maximum positive torque to the turbine engine, a maximum flow of available air is passed through the starter turbine. The effect of the torque supplied to the turbine engine by the starter turbine is reflected by the change in slope of $N_E$, i.e., the slope between $T_0$ and $T_3$ is greater than the slope between $T_3$ and $T_4$.

At $T_4$, ignition occurs in the turbine engine. Consequently, the turbine engine supplies itself with some positive torque. With both turbines now supplying positive torque, the turbine engine accelerates beyond $N_{ref}$ and $N_{pe}$. At some point before reaching a maximum pawl disengage speed, $N_{pd}$, the turbine engine becomes self sustaining. $N_{pd}$ is the speed at which all of the pawls, which typically disengage at slightly different speeds, are known to be disengaged. The starter turbine continues to assist the turbine engine beyond $N_{ref}$ and $N_{pe}$ since at least one pawl is still locked-in, i.e., $N_T=N_E$.

At $T_5$, the turbine engine accelerates past $N_{pd}$. All of the pawls are disengaged from the ratchet member since $N_E$ is greater than $N_{pd}$. Since the pawls are no longer engaged, the air flow through the starter turbine is decreased to slow $N_T$ to and hold it at $N_{ref}$. At $T_6$, the turbine engine has accelerated to $N_{ess}$ and is holding there, thus indicating a successful restart. Since the restart is successful, the starter turbine is shut off.

Figure 2:
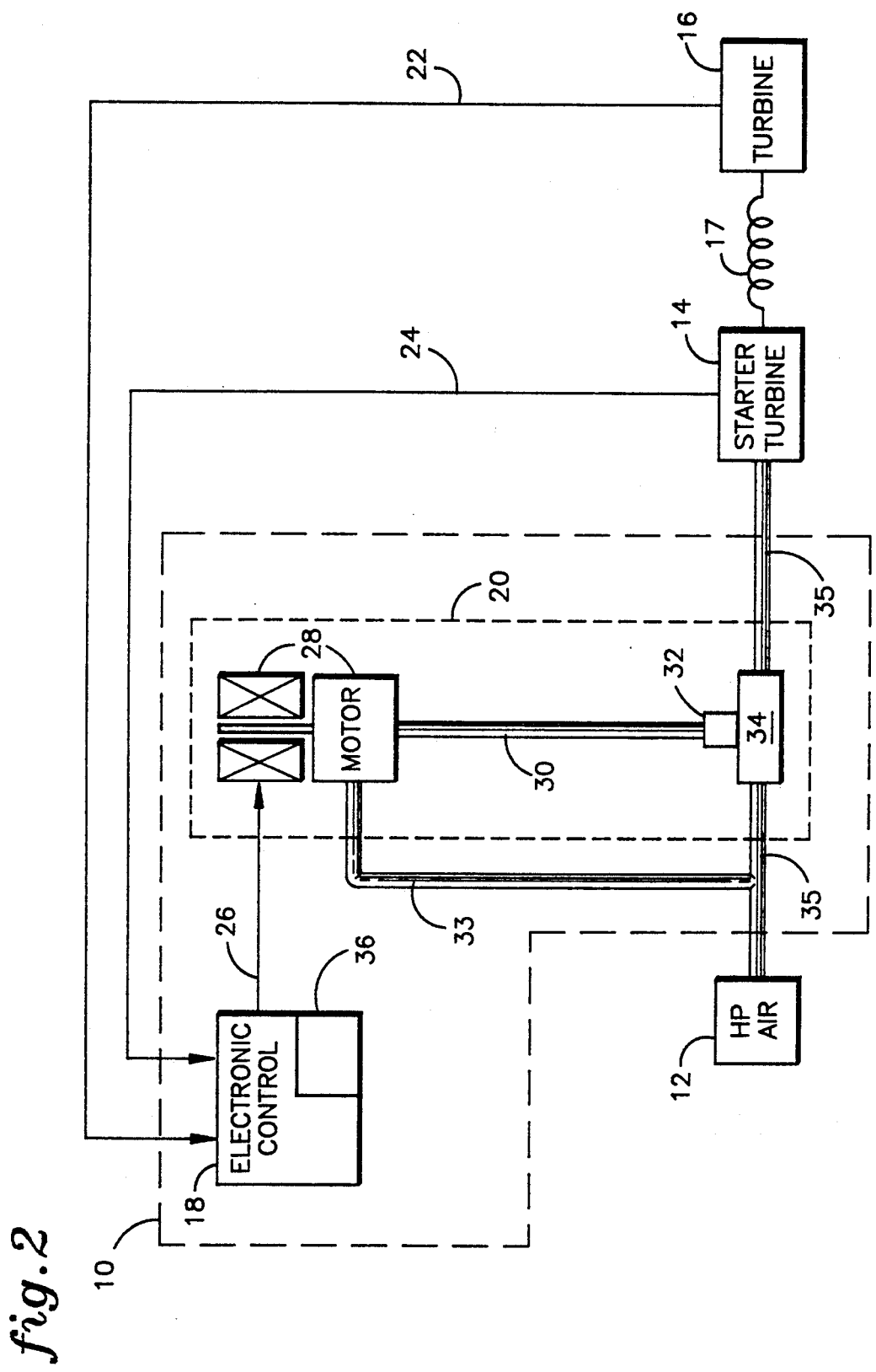
FIG. 2 is a functional schematic diagram of a control system which produces the restart of FIG. 1.

FIG. 2 is a functional schematic diagram of a control system 10 operatively connected to a high pressure air supply 12 and a starter turbine 14. Connected as such, the control system 10 produces the restart sequence described hereinbefore with respect to FIG. 1. The starter turbine 14 is operatively connected to the control system 10 and a turbine engine 16. The starter turbine 14 and the turbine engine 16 are coupled by a ratchet and pawl clutch 17 as described hereinbefore. The control system 10 includes an electronic control 18 and a mechanical pneumatic actuation means 20. The electronic control 18 may be imbedded in a conventional electronic engine control, EEC, which is typically associated with a turbine engine for controlling the operation of the turbine engine.

The electronic control 18 provides the processing capability for the control system 10. The electronic control 18 is configured to receive a first, second, third and fourth $N_E$ signal 22 corresponding to $T_0$, $T_4$, $T_5$, and $T_6$ respectively from the turbine engine 16 and an $N_T$ signal 24 from the starter turbine 14. Using the $N_E$ signal 22 and the $N_T$ signal 24, the electronic control 18 computes a desired speed for the starter turbine 14, such as $N_{ref}$, maximum speed, or zero speed, and an electrical adjustment current, $I_o$, signal 26 to reach the desired speed.

The adjustment dictated by the $I_o$ signal 26 is received by the mechanical pneumatic actuation means 20 which includes a motor means 28, such as a torque motor or pulse width modulated solenoid, a servo line 30, a pneumatic actuator 32, a servo supply line 33, a valve 34, such as an in-line or butterfly valve, and a duct 35. The motor means 28 is operatively connected to the electronic control 18, the servo supply line 33, and the servo line 30. The servo line 30 is disposed between and connected to the motor means 28 and the pneumatic actuator 32.

The motor means 28 receives the $I_o$ signal 26 from the electronic control 18. In response to the $I_o$ signal 26, the motor means 28 modulates an air flow in the servo line 30. The air flow is supplied by the high pressure air supply 12 through the servo supply line 33. The pneumatic actuator 32 is disposed between and connected to the servo line 30 and the valve 34. In response to the modulation of the air flow in the servo line 30, the pneumatic actuator 32 moves at a velocity corresponding to the magnitude of the air flow in the servo line 30. The valve 34 is operatively connected to the pneumatic actuator 32, the high pressure air supply 12 and the starter turbine 14. As the pneumatic actuator 32 moves, it opens and closes the valve 34. As the valve 34 opens and closes, it modulates the air flow through the duct 35 from the high pressure air supply 12 to the starter turbine 14. In response to modulation of the air flow, the starter turbine 14 changes speed, i.e., $N_T$ changes. Thus, $N_T$ changes in response to changes in the $I_o$ signal 26.

The control system 10 of the present invention facilitates restart of the turbine engine 16 by the starter turbine 14 after flame-out without danger of crash engagement. When the turbine engine 16 is operating normally, the valve 34 is closed and the starter turbine 14 is off. When the restart is initiated after flame out, a restart control logic 36 section located within the electronic control 18, being operative to accelerate the starter turbine 14 to $N_{ref}$ and hold it at that speed, produces the appropriate $I_o$ signal 26. The $I_o$ signal 26 is based on the difference between an $N_{ref}$ signal (not illustrated) which is produced within the electronic control 18 and the $N_T$ signal 24. The mechanical pneumatic actuation means 20 responds as described hereinbefore. When the pawls lock-in to the ratchet member, i.e., $N_T=N_E$, the restart control logic 36 produces the appropriate $I_o$ signal 26 which directs a maximum air flow to the starter turbine 14. The starter turbine 14 then supplies torque to the turbine engine 16 and the turbine engine 16 eventually ignites and accelerates. When the pawls disengage, i.e., $N_E > N_{pd}$, the restart control logic 36 operates to produce the appropriate $I_o$ signal 26 which modulates $N_T$ to $N_{ref}$ and holds it there. Finally, when the turbine engine 16 reaches $N_{ess}$, i.e., $N_E = N_{ess}$, the restart control logic 36 develops the appropriate $I_o$ signal 26 to close the valve 34 so that the starter turbine 14 stops rotating.

Figure 3:
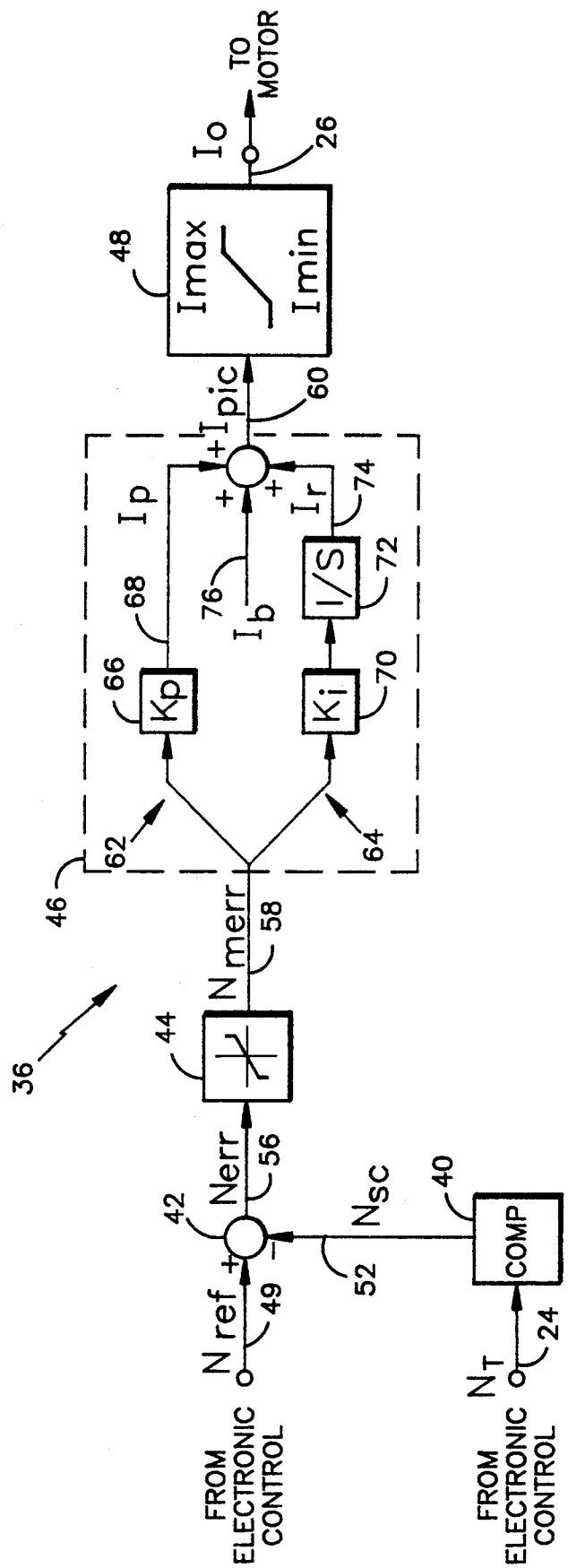
FIG. 3 is a block diagram of the restart control logic of FIG. 2.

FIG. 3 is a block diagram of the restart control logic 36 of FIG. 2. The restart control logic 36 includes a dynamic compensation block 40, a comparator 42, a non-linear gain block 44, a proportional plus integral control, PIC 46, and a current limiter block 48. The restart control logic 36 is operative in response to an $N_{ref}$ signal 49 and the $N_T$ signal 24 to provide the $I_o$ signal 26. When enabled, the restart control logic 36 modulates $N_T$ to $N_{ref}$. The $N_{ref}$ signal 49 is stored and produced in the electronic control 18 (FIG. 2) by means well known in the art.

The compensation block 40 compensates for a starter turbine rotor lag time constant. The compensation block 40 is operatively connected to the $N_T$ signal 24 and the comparator 42. The rotor lag time constant exists because the starter turbine 14 (FIG. 2) does not respond instantaneously to air flow changes. The compensation block 40 has a transfer function in the LaPlace transform domain $$\frac{T_{c1}s + 1}{T_{c2}s + 1},$$

where $T_{c1}$ is substantially equal to the rotor lag time constant and $T_{c2}$ is approximately 0.1 $T_{c1}$. The output of the compensation block 40 is a sensed compensated speed, $N_{sc}$, signal 52. The implementation of such a compensation block 40 is well known in the art.

The non-linear gain block 44 is operative to more quickly correct for large errors in $N_T$. The comparator 42 is operatively connected to the compensation block 40, the $N_{ref}$ signal 49 and the non-linear gain block 44. An error, $N_{err}$, signal 56 is generated in the comparator 42 by taking the difference of $N_{ref}$ and $N_{sc}$, i.e., $N_{ref} - N_{sc}$. The non-linear gain block 44 is disposed in series with and connected to the comparator 42 and the PIC 46. A gain applied to the $N_{err}$ signal 56 in the non-linear gain block 44 varies according to the absolute value of $N_{err}$. More particularly, a higher absolute value $N_{err}$ will receive more gain than a lower absolute value $N_{err}$. The result is that the $I_o$ signal 26 will be greater when the absolute value of $N_{err}$ is greater, thus directing a greater air flow through the starter turbine 14 (FIG. 2) which more rapidly corrects for the error in $N_T$. The output of the non-linear gain block 44 is a modified error, $N_{merr}$, signal 58 which is fed to the PIC 46. The implementation of such a non-linear gain block 44 is well known in the art.

The PIC 46 is operative to provide an accurate steady state and transient output current, $I_{pic}$, signal 60. The PIC 46 is disposed in series with and connected to the non-linear gain block 44 and the current limiter block 48. A proportional branch 62 is operative to provide relatively large correction adjustments on the $N_{merr}$ signal 58. An integral branch 64 is operative to provide relatively small adjustments on the $N_{merr}$ signal 58. The proportional branch 62 includes a proportional constant block 66. The output of the proportional branch 62 is a proportional, $I_p$, signal 68. The $I_p$ signal 68 is the product of $N_{merr}$ and a proportional constant, $K_p$, i.e., $$I_p = N_{merr} \times K_p.$$

The integral branch 64 includes an integral constant block 70 and an integrator block 72. An output, $I_r$, signal 74 of the integral branch 64 is the integral of the product of $N_{merr}$ and an integral constant, $K_i$, i.e., $$I_r = \int N_{merr} \times K_i \, dt.$$

Bounds are imposed on the $I_r$ signal 74 to limit the authority of the integral branch 64. Values for $K_i$ and $K_p$ are selected to give good dynamic response and stability of the control system 10 (FIG. 2). Those skilled in the art will be able to ascertain values of $K_p$ and $K_i$ for proper operation. A current bias, $I_b$, signal 76 is the current necessary to maintain the motor means 28 (FIG. 2) in a steady position. The $I_p$ signal 68, the $I_r$ signal 74 and the $I_b$ signal 76 are summed to form the $I_{pic}$ signal 60. The implementation of such a PIC 46 is well known in the art.

The current limiter block 48 is operative to set upper and lower boundaries for the $I_o$ signal 26 in order not to damage the motor means 28 (FIG. 2) and the valve 34 (FIG. 2). The implementation of such a current limiter block 48 is well known in the art.

Although the invention has been shown and described with respect to a best mode embodiment exemplary thereof, it should be understood by those skilled in the art that various modifications, changes, omissions, and additions in the form and detail thereof may be made without departing from the spirit and scope of the invention.

What is claimed is:

1. An electronic control system for preventing crash engagement between a clutch ratchet member mounted on a starter turbine, and clutch pawls mounted on a turbine engine, said control system comprising:
    a) means for sensing actual rotational speed of the turbine engine;
    b) valve means for controlling high pressure air flow from a source of high pressure air to said starter turbine; and
    c) valve control means functionally connected to said means for sensing, said valve control means being operable to regulate said valve means to selectively modulate high pressure air flow to said starter turbine in response to signals from said means for sensing, said valve control means being operable to:
        i) regulate said valve means to create a predetermined high pressure air stream flow rate which will accelerate said starter turbine from a standstill state to a steady holding speed, all in response to a first signal from said means for sensing, which first signal is indicative of a flame out-induced deceleration of said turbine engine; said holding speed being less than the sensed speed of the turbine engine, and less than a predetermined decelerated all pawl-engaging turbine engine speed wherein all of said clutch pawls are known to be deployed for interlocking engagement with associated teeth on said ratchet member;

ii) maintain said predetermined high pressure air stream flow rate until receipt of a second signal from said means for sensing, which second signal is indicative of a turbine engine speed which is less than said holding speed and which signifies engagement of the clutch pawls and ratchet member during holding speed of said starter turbine and decelerating speed of said turbine engine; and iii) after receipt of said second signal, regulate said valve means to increase the high pressure air stream to a maximum flow rate so as to accelerate said starter turbine to speeds above said holding speed.

2. The system of claim 1 wherein said valve control means is further operable to regulate said valve means to recreate said predetermined high pressure air stream flow rate upon receipt of a third signal from said means for sensing which third signal is indicative of an all pawl-disengaging turbine engine speed, so as to return and maintain said starter turbine at said holding speed after disengagement of said clutch members.

3. The system of claim 1 wherein said valve control means is further operable to regulate said valve means to shut off high pressure air flow to said starter turbine upon receipt of a fourth signal from said means for sensing, which fourth signal is indicative of a sustained steady state turbine engine speed.

4. The system of claim 1 wherein said steady holding speed is about 200 rpm less than said all pawl-engaging turbine engine speed.

* * * * *